United States Patent [19]

Skipper

[11] Patent Number: 4,735,444
[45] Date of Patent: Apr. 5, 1988

[54] PIPE COUPLING FOR WELL CASING

[75] Inventor: Claud T. Skipper, P.O. Box 7929, Houston, Tex. 77270

[73] Assignee: Claud T. Skipper, Houston, Tex.

[21] Appl. No.: 41,254

[22] Filed: Apr. 7, 1987

[51] Int. Cl.⁴ ............................................. H16L 13/02
[52] U.S. Cl. .................................... 285/286; 285/351; 285/355; 285/422
[58] Field of Search ............... 285/355, 390, 333, 334, 285/351, 386, 422, 286; 403/343

[56] References Cited

U.S. PATENT DOCUMENTS

| | | | |
|---|---|---|---|
| 1,218,359 | 3/1917 | Beatty | 285/390 X |
| 1,993,269 | 3/1935 | Fletcher | 285/333 X |
| 2,150,221 | 3/1939 | Hinderliter | 285/333 X |
| 3,495,854 | 2/1970 | Fether | 285/390 X |
| 4,085,951 | 4/1978 | Morris | 285/355 X |
| 4,348,041 | 9/1982 | Imai | 285/422 X |
| 4,366,972 | 1/1983 | Franklin | 285/286 X |
| 4,564,225 | 1/1986 | Taylor | 285/333 |

FOREIGN PATENT DOCUMENTS 2152168  7/1985  United Kingdom ............... 285/333

Primary Examiner—Dave W. Arola
Attorney, Agent, or Firm—Millen & White

[57] ABSTRACT

A pipe coupling for a stainless steel well casing includes a square threaded male member which is received within a square threaded female member so that the coupling is initially loose. O-ring seals are provided to prevent the fluid being pumped from corroding threaded portions of the male and female members. Each member has a shoulder which is abutted by the end of the other member in order to lock the members in rigid relationship.

13 Claims, 2 Drawing Sheets

PIPE COUPLING FOR WELL CASING

BACKGROUND OF THE INVENTION

The instant invention relates to pipe couplings, more specifically, the instant invention relates to pipe couplings which are especially useful for wells, such as water wells which may have for one reason or another corrosive substances therein.

Normally, when wells are drilled, wells require tubular casings in the form of lengths of pipe which are coupled to one another. For some applications, such as pumping out ground water which may include corrosive materials, it is necessary to use stainless steel pipes. Since stainless steel pipes are expensive, economic constraints dictate that the pipes should have walls as thin as is consistent with the task that the pipes are required to undertake. It is frequently difficult to join thin walled pipes, simply because one cannot readily cut threads into the walls without reducing the thickness of the pipe below an acceptable dimension at its juncture with other pipes. Stainless steel pipes can be welded together, however welding is frequently difficult in the field and results in a bead around the exterior of the joint which could interfere with a pipe sliding smoothly into a bore hole. This is especially the case where the pipe is hundreds of feet long and may tend to bow when inserted into a well hole. Accordingly, it is necessary to provide the pipe with some type of end coupling which is easy to join in the field and which will provide a smooth exterior surface to the entire casing.

The prior art does not adequately address this problem as is evident from a number of United States patents directed to the art of joining pipes. For example, U.S. Pat. No. 3,493,854 to Fether discloses the concept of welding male and female members to pipes. However, the bead is applied externally which is not always suitable for well casing applications in which valuable pipe is used, such as stainless steel pipe which one may desire to remove from the well hole after pumping is complete. Moreover, this patent does not disclose structure for adequately sealing the coupling against leakage so that corrosive materials do not corrode the threads of the pipe and cause leakage, or cause the threads to bind so that the coupling cannot be easily disconnected. It is especially important to provide seals when the threads are square threads in that square threads have considerable play.

While the prior art discloses numerous structures used for purposes which supposedly solve various problems different from the problems solved by the instant invention, these structures are not combined with structure one would apply to address the problems of interest in the particular art under consideration. For example, U.S. Pat. No. 1,393,057 to Vollmer and numerous other patents disclose O-rings, however, the O-rings are not arranged in such a way as to facilitate adequate sealing of couplings for water well casings, wherein the couplings are very easy to join and separate yet are strong and leak proof. Likewise, U.S. Pat. Nos. 4,192,533 to Blowse and 4,377,302 to Kohyama disclose O-ring seals, yet the particular thread arrangements are expensive to machine and do not result in a casing joint which is easy to couple by inexperienced workers.

SUMMARY OF THE INVENTION

It is an object of the instant invention to provide a new and improved pipe joint which is especially suitable for joining thin walled, stainless steel pipes used to make casings for wells.

Upon further study of the specification and appended claims, further objects and advantages of this invention will become apparent to those skilled in the art.

In view of the aforementioned object and other objects the instant invention contemplates:

A pipe coupling for joining first and second pipes, wherein pipe coupling comprises a tubular male member having first and second ends and a tubular female member having first and second ends wherein the first ends of the male and female members abut the pipes while the second end of the male member is received within the female member and the second end of the female member extends over the male member. The first ends of the male and female members are fixed to opposed ends of the first and second pipes, respectively. The male member has a first portion having an outside diameter equal to that of the first pipe and a second portion having a reduced outside diameter and joining the first portion at a first radial shoulder. The reduced diameter portion has a first unthreaded cylindrical surface adjacent the first shoulder with a groove therein. A threaded section extends from the first cylindrical section, the threaded section having threads of a square cross-section. A second cylindrical surface extends from the threaded portion to the second end of the male member, while the second end of the male member presents a radial surface perpendicular to the axis of the male member. The male member has a constant internal diameter over substantially the entire length thereof except for a frusto-conical section adjacent the first end thereof. The female member has a constant outside diameter over the entire length thereof with the outside diameter of the female member being equal to the outside diameter of the first portion of the male member and with the second end of the female member being a radial surface normal to the axis of the female member. The female member has a first portion with an internal diameter substantially equal to that of the internal diameter of the male member with the first portion being joined to the first end of the female member by a frusto-conical surface. The female member has a second portion of a diameter less than the first portion and greater than the second portion of the male member, the second portion of the female member having a cylindrical surface adjacent the shoulder with the cylindrical surface having a circular groove therein. A threaded portion extending from the first cylindrical portion, the threaded portion having square threads thereon which complement the square threads of the threaded portion on the male member. A second cylindrical surface is positioned between the threaded portion and the second end of the female member, the second cylindrical surface having an internal diameter greater than the internal diameter of the first cylindrical surface and slightly greater than the first cylindrical surface on the male member. The distance between the shoulders and second ends of the male and female members are identical so that the members lock up tightly when the second end of one member abuts the shoulder of the other. O-ring seals are disposed in the grooves of the first surfaces of the male and female members whereby when the threads are engaged and the male and female members are screwed together, the O-rings create seals with the second cylindrical surfaces of the members while the joint between the members of the coupling is rigidified upon engagement of the second ends of the male and female members with the respective shoulders of the female and male members.

In accordance with a preferred embodiment of the invention, the coupling is made of stainless steel as are the pipes to be joined by the coupling. The O-rings are made of polytetrafluoroethylene sold under the trademark "TEFLON".

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 3:
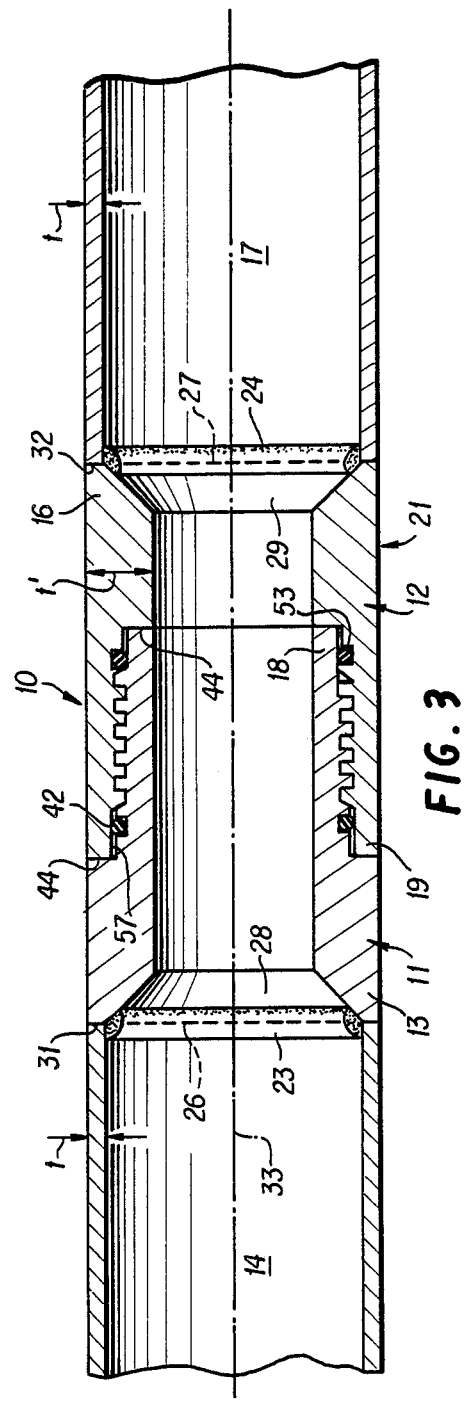
FIG. 3 is a side cross-section of the pipe coupling of FIG. 2 showing the male and female members joined and the coupling welded to pipes coupled thereby.

Referring now to the figures, there is shown a pipe coupling, designated generally by the numeral 10, configured in accordance with the principles of the instant invention. The pipe coupling 10 comprises a male member, designated generally by the numeral 11, and a female member, designated generally by the numeral 12. The male member 11 has a first end 13 which is welded to a first pipe 14, as is seen in FIG. 3, while the female member 12 has a first end 16 which is welded to a second pipe 17. The male member 11 has a second end 18 which is received within the female member 12 while the female member has a second end 19 which fits over a portion of the male member resulting in the coupling 10 in which the second ends of the male and female members join the members to one another, while the first ends of the male and female members join the members to the first and second pipes 14 and 17 to form a casing, designated generally by the numeral 21.

Figure 1:
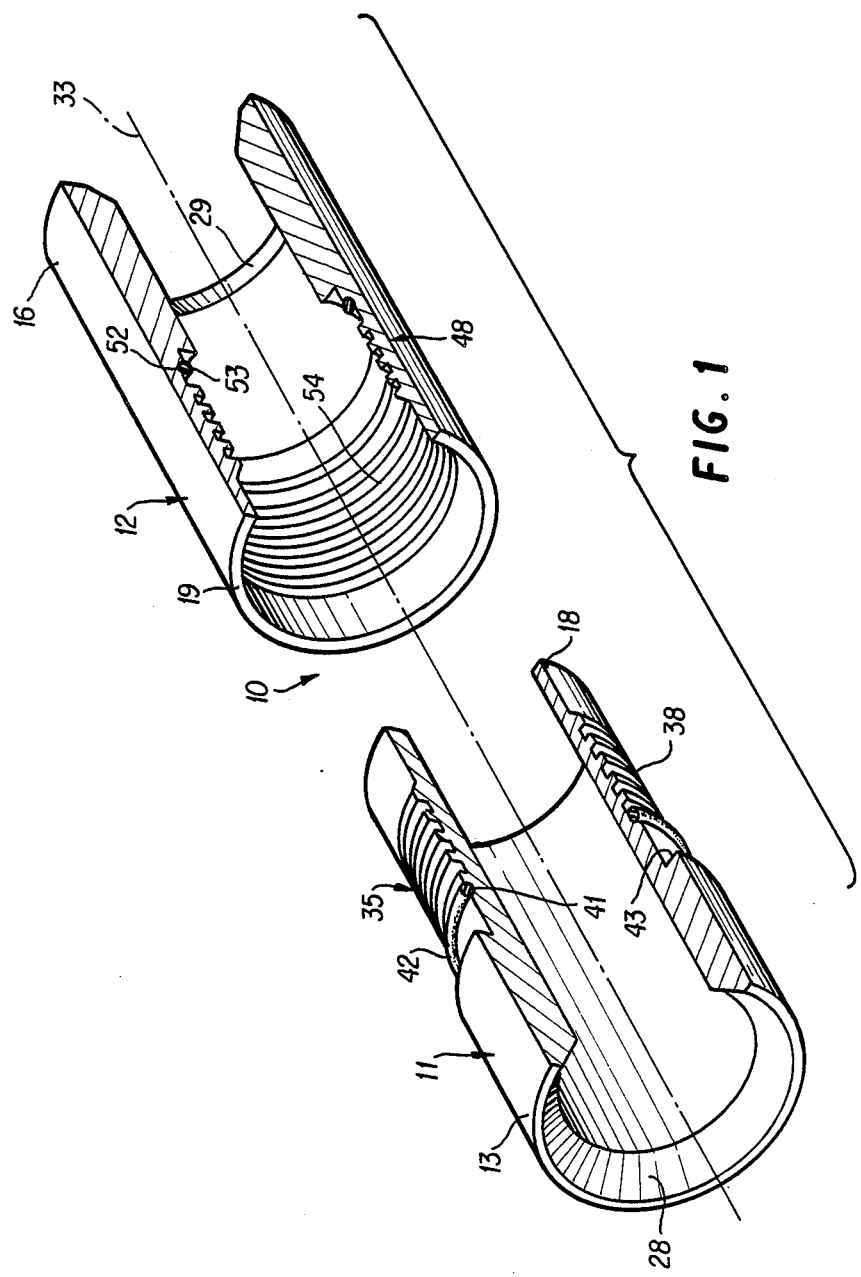
FIG. 1 is a perspective exploded view partially in section showing a pipe coupling in accordance with the principles of the instant invention.
Figure 2:
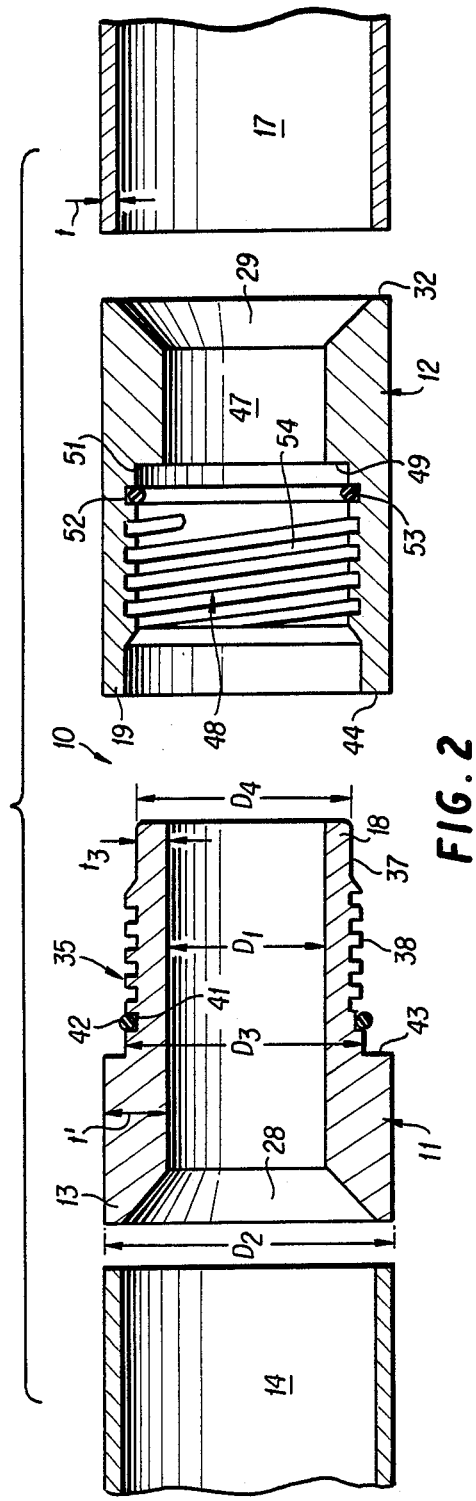
FIG. 2 is a side elevation of the pipe coupling of FIG. 1 showing male and female members of the coupling disassembled from both one another and from the pipes that they join.

As is readily seen in FIGS. 2 and 3, the pipes 14 and 17 have walls of relatively thin cross-section t while the coupling 10 has walls of a relatively thick cross-section t'. In accordance with a preferred embodiment of the instant invention, the pipes 14 and 17 are made of stainless steel and are of a thickness too thin to accommodate threads of sufficient height to permit an external sleeve having internal threads to adequately join the pipes. Moreover, an external sleeve would present either an abutment or wide diameter portion on the casing making sliding of the casing within a well hole more difficult and perhaps requiring that the well hole have a larger diameter just to accommodate couplings.

As can be readily seen from FIG. 3, the casing 21 has a smooth exterior because the first and second pipes 14 and 17, respectively, adjoin to the first ends 13 and 16 of the coupling 12 by internal circular welds 23 and 24, respectively. Since the welds 23 and 24 are proximate the ends of the pipes 14 and 17 and since the male and female coupling elements 11 and 12 are relatively short, there is equipment readily available on the market for making the internal welds 23 and 24. The welds 23 and 24 are of course made before the coupling 10 is joined. In order to facilitate formation of the welds 23 and 24 by providing access to the seams 26 and 27 between the first and second pipes 14 and 17 and the first ends 13 and 16 of the coupling 10, the male member 11 has a frusto-conical interior surface 28 and the female member 12 has a frusto-conical internal surface 29. Adjacent the frusto-conical surfaces 28 and 29 are radially extending surfaces 31 and 32 on the male and female members 11 and 12, respectively, each of which extends normal to the axis 33 of the coupling 10 and casing 21 and which have widths equal to the thicknesses t of the pipes 14 and 17. In addition to providing an accessible surface for welding, the frusto-conical surfaces 28 and 29 offer less resistance to the flow of water in the casing than would surfaces disposed normal to the axis 33 of the casing 21.

Considering now the male member 11 separately, with the exception of the frusto-conical portion 26 the male member has a constant internal diameter $D_1$. The external diameter of the male member 11 varies along its axial length from diameter $D_2$ which is of course equal to the external diameter of the pipes 14 and 17 to diameter $D_3$ which is the external diameter of a first cylindrical surface 36 and diameter $D_4$ which is the external diameter of a second cylindrical surface 37 on a second portion 35 of the male member. Disposed between the first and second cylindrical surfaces 36 and 37, respectively, is a threaded portion 38.

The threads 38 on the male member 11 are square in cross-section and may be formed by either a single or double cut. The cylindrical surface 36 has a groove 41 extending completely therearound which is square in cross-section and which receives a first TEFLON O-ring 42 that is circular in cross-section and has a thickness greater than the depth of the groove in which it is received. Spaced from the O-ring 42 is an annular shoulder 43 having a height equal to the width of the surface 44 of the second end 18 of female member 11. The aforedescribed structure of the male member 11 cooperates with complementary structure on the female member 12 to provide an easily assembled, sealed joint for pipe casing 21 which is both strong and rigid.

Referring now more particularly to the female member 12, it is seen that the female member 12 has a constant exterior diameter equal to $D_2$ which is of course equal to the external diameter of the first portion of the male member and the external diameter of the first and second pipes 14 and 17. The female member has a first portion 47 which has a diameter equal to diameter $D_1$ of the bore of male member 11 and a second portion designated generally by the numeral 48 which complements the second portion 35 of the male member 11. The second portion 48 is adjacent a shoulder 49 which has a height equal to the thickness $t_3$ of the second cylindrical surface 37 on the female member 11. Adjacent the annular shoulder 49 is a first cylindrical surface 51 which has an annular groove 52 of square cross-section therein which receives a second TEFLON O-ring 53 which is circular in cross-section and has a cross-sectional thickness greater than the depth of the square annular groove 52. As with the groove 41 in male member 11, the groove 52 is spaced from the shoulder 49. A female thread 54 is cut into the second portion 48 just beyond the groove 52. The thread of the threaded portion 54 may be generated by a single cut or double cut and complements the thread 38 on the second portion 35 of the male member 11. The width of the thread 54 is somewhat less than the width of the thread 38 so that when the threads are engaged, the male member 11 may move axially with respect to the female member 12. Moreover, the height of the threads 38 is slightly less than the depth of the threads 54 so that the male member 11 may move radially with respect to the female member while the members are being joined. Consequently, while joining the male and female members 11 and 12, there is play between the members so that the pipe coupling 10 can accommodate misalignment of the first and second pipes 14 and 17 when they are brought together for joining. Between the radial end surface 44 of the female member 12 and the threads 54 there is a second interior cylindrical surface 57 which has a diameter just slightly larger than the diameter $D_3$ of the cylindrical surface 36 on female member 11.

As the male member 11 is screwed into the female member 12, the pipe coupling 10 is relatively loose until cylindrical surface 57 begins to advance over O-ring 42 and cylindrical surface 37 advances over O-ring 52. The cylindrical surfaces deform the O-rings 42 and 53 spreading the O-rings in their respective square grooves 41 and 52. Portions of the O-rings 42 and 53 extend above the surfaces 36 and 51 respectively and press against the advancing complementary surfaces 57 and 37 respectively. Since the O-rings are made of TEFLON, they tend to lubricate the interface between the rings and the surfaces 37 and 57 while at the same time exerting pressure against those surfaces due to their resistance to deformation. Finally, the second ends, 44 on the female member 12 and 50 on the male member 11, abut the shoulders 43 and 49 respectively so as to lock the male and female members in rigid relationship.

The resulting coupling is easy to perform by inexperienced personnel, provides well casing 21 which has a smooth exterior, does not leak and can be readily disassembled by simply unscrewing one of the pipes 14 or 17 with respect to the other.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A pipe coupling for joining first and second pipes along a common axis, the pipe coupling comprising:
   a tubular male member having first and second ends and a tubular female member having first and second ends wherein the first ends of the male and female members abut the pipes while the second end of the male member is received within a portion of the female member and the second end of the female member extends over a portion of the male member;
   means for fixing the first ends of the male and female members to opposed ends of the first and second pipes, respectively;
   the male member having a first portion having an outside diameter equal to that of the first pipe and a second portion having a reduced outside diameter and joining the first portion at a first radial shoulder, the reduced diameter portion having a first unthreaded cylindrical surface adjacent the first shoulder, the first cylindrical surface having a groove therein spaced from the first radial shoulder; a threaded section extending from the first cylindrical section, the threaded section having threads of a square cross-section; a second cylindrical surface extending from the threaded section to the second end of the male member, the second end of the male member presenting a radial surface perpendicular to the axis of the coupling;
   the male member having a constant internal diameter over substantially the entire length thereof except for a frusto-conical section adjacent the first end thereof;
   the female member having a constant outside diameter over the entire length thereof, the outside diameter of the female member being equal to the outside diameter of the first portion of the male member with the second end of the female member being a radial surface normal to the axis of the female member; the female member having a first portion with an internal diameter equal to that of the internal diameter of the male member, said first portion joining the first end of the female member with a frusto-conical surface; the female member having a second portion of a diameter less than the first portion and greater than the second portion of the male member, the second portion of the female member having a cylindrical surface adjacent a second radial shoulder, the cylindrical surface of the female member having a circular groove therein spaced from the second radial shoulder; a threaded section extending from the first cylindrical portion, the threaded section having square threads thereon which complement the square threads of the threaded section on the male member; a second cylindrical surface between the threaded section and the second end of the female member, the second cylindrical surface having an internal diameter greater than the internal diameter of the first cylindrical surface and slightly greater than the first cylindrical surface on the male member; the distance between the shoulders and second ends of the male and female members being identical; and
   O-ring seals disposed in the grooves in the first cylindrical surfaces of the male and female members, whereby when the threads are engaged and the male and female members are screwed together, the O-rings effect seals with the second cylindrical surfaces of the members while the joint between the members of the coupling is rigidified upon engagement of the second ends of the male and female members with the shoulders of the female and male members.

2. The coupling of claim 1 wherein the coupling is made of stainless steel as are the pipes to be joined by the coupling.

3. The coupling of claim 2 wherein the means for joining the first ends of the members to the ends of the pipes are internal welds, the first ends of the members abutting the pipes directly and the welds having beads which overlie at least a portion of the interior wall of the pipe and the frusto-conical surfaces of the male and female members.

4. The coupling of claim 1 wherein the threads have been cut as multiple lead threads.

5. The coupling of claim 1 wherein the male and female threads have considerable axial and radial spacing therebetween whereby there is play between the male and female members until the second cylindrical surfaces engage the O-rings and stiffen the coupling.

6. The coupling of claim 5 wherein O-rings are made of TEFLON.

7. The coupling of claim 1 wherein the O-rings are made of TEFLON.

8. The coupling of claim 1 wherein the square thread has been cut as a single lead.

9. A stainless steel well casing including pipe couplings for joining adjacent pipe sections, the pipe couplings each comprising:

a tubular male member having first and second ends and a tubular female member having first and second ends wherein the first ends of the male and female members abut the pipes while the second end of the male member is received within the female member and the second end of the female member extends over the male member;

the male member having a first portion having an outside diameter equal to that of the one pipe and a second portion having a reduced outside diameter and joining the first portion at a first radial shoulder, the reduced diameter portion having a first unthreaded cylindrial surface adjacent the first radial shoulder, the first cylindrical surface having a groove there axially spaced from the first radial shoulder, a threaded section extending from the first cylindrical section, the threaded section having threads of a square cross-section; a second cylindrical surface extending from the threaded section to the second end of the male member, the second end of the male member presenting a radial surface perpendicular to the axis of the male member; the male member having a constant internal diameter over substantially the entire length thereof except for a frusto-conical section adjacent the first end thereof;

the female member having a constant outside diameter over the entire length thereof, the outside diameter of the female member being equal to the outside diameter of the first portion of the male member with the second end of the female member being a radial surface normal to the axis of the female member; the female member having a first portion with an internal diameter equal to that of the internal diameter of the male member, said first portion joining the first end of the female member with a frusto-conical surface; female member having a second portion of a diameter less than the first portion and greater than the second portion of the male member, the second portion of the female member having a cylindrical surface adjacent the second radial shoulder, the cylindrical surface having a circular groove therein spaced from the second radial shoulder; a threaded section extending from the first cylindrical portion, the threaded section having square threads thereon which complement the square threads of the threaded section on the male member; a second cylindrical surface between the threaded section and the second end of the female member the second cylindrical surface having an internal diameter greater than the internal diameter of the first cylindrical surface and slightly greater than the first cylindrical surface on the male member; the distance between the shoulders and second ends of the male and female members being identical;

O-ring seals disposed in the grooves and the first surfaces of the male and female members whereby when the threads are engaged and the male and female members are screwed together the O-rings effect seals with the second cylindrical surfaces of the members while the joint between the members of the coupling is rigidified upon engagement of the second ends of the male and female members with the shoulders of the female and male members; and internal welds for joining the first end members to adjacent sections of pipes, the first ends of the members abutting the pipes directly and the welds having beads which overly at least a portion of the interior wall of the pipe and the frusto-conical surfaces of the male and female members.

10. A pipe coupling for joining first and second pipes along a common axis, the pipe coupling comprising:

a tubular male member having an end and a tubular female member having an end wherein the end of the male member is received within a portion of the female member and the end of the female member extends over a portion of the male member;

the male member having a first portion having an outside diameter equal to that of the first pipe and a second portion having a reduced outside diameter and joining the first portion at a first radial shoulder, the reduced diameter portion having a first unthreaded cylindrical surface adjacent the first shoulder, the first cylindrical surface having a groove therein spaced from the first radial shoulder; a threaded section extending from the first cylindrical section, the threaded section having threads of a square cross-section; a second cylindrical surface extending from the threaded section to the end of the male member, the end of the male member presenting a radial surface perpendicular to the axis of the coupling;

the male member having a constant internal diameter over substantially the entire length thereof;

the female member having a constant outside diameter over the entire length thereof, the outside diameter of the female member being equal to the outside diameter of the first portion of the male member with the end of the female member being a radial surface normal to the axis of the female member; the female member having a first portion with an internal diameter equal to that of the internal diameter of the male member, said first portion joining the first end of the female member with a frusto-conical surface; the female member having a second portion of a diameter less than the first portion and greater than the second portion of the male member, the second portion of the female member having a cylindrical surface adjacent a second radial shoulder, the cylindrial surface of the female member having a circular groove therein spaced from the second radial shoulder; a threaded section extending from the first cylindrical portion, the threaded section having square threads thereon which complement the square threads of the threaded section on the male member; a second cylindrical surface between the threaded section and the second end of the female member, the second cylindrical surface having an internal diameter greater than the internal diameter of the first cylindrical surface and slightly greater than the first cylindrical surface on the male member; the distance between the shoulders and the ends of the male and female members being identical; and O-ring seals disposed in the groove in the first cylindrical surfaces of the male and female members, whereby when the threads are engaged and the male and female members are screwed together, the O-rings effect seals with the second cylindrical surfaces of the members while the joint between the members of the coupling is rigidified upon engagement of the ends of the male and female members with the shoulders of the female and male members.

11. The coupling of claim 10 wherein the coupling is made of stainless steel as are the pipes to be joined by the coupling.

12. The coupling of claim 10 wherein the O-rings are made of TEFLON.

13. The coupling of claim 12 wherein the male and female threads have considerable axial and radial spacing therebetween whereby there is play between the male and female members until the second cylindrical surfaces engage the O-rings and stiffen the coupling.

* * * * *